(12) United States Patent
Nakazawa et al.

(10) Patent No.: US 7,649,321 B2
(45) Date of Patent: Jan. 19, 2010

(54) IRRADIATION DIRECTION CONTROL APPARATUS AND METHOD

(75) Inventors: Yuichi Nakazawa, Shizuoka (JP); Tomoyuki Sakai, Shizuoka (JP); Yohnosuke Hara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 869 days.

(21) Appl. No.: 11/209,499

(22) Filed: Aug. 22, 2005

(65) Prior Publication Data
US 2006/0039131 A1    Feb. 23, 2006

(30) Foreign Application Priority Data
Aug. 23, 2004   (JP)   ............ P.2004-241909

(51) Int. Cl.
*B60Q 1/02* (2006.01)
(52) U.S. Cl. .............. 315/82; 315/159; 315/307; 315/291; 362/465; 362/466; 362/467; 362/284
(58) Field of Classification Search .......... 362/276, 362/460, 464–467, 284, 286; 315/77, 82, 315/360, 149, 159, 291, 307; 307/10.1, 10.8; 123/397; 702/150
See application file for complete search history.

(56) References Cited

U.S. PATENT DOCUMENTS

| 5,235,951 A * | 8/1993 | Taguchi et al. .......... 123/397 |
| 6,193,398 B1 * | 2/2001 | Okuchi et al. ........... 362/466 |
| 6,305,823 B1 * | 10/2001 | Toda et al. ............. 362/276 |
| 6,430,521 B1 * | 8/2002 | Toda .................... 702/150 |
| 6,445,085 B1 * | 9/2002 | Toda et al. ............. 307/10.8 |

FOREIGN PATENT DOCUMENTS

| JP | 2000-118293 | 4/2000 |
| JP | 2002-036945 | 2/2002 |
| JP | 2004-155249 | 6/2004 |

* cited by examiner

*Primary Examiner*—Haissa Philogene
(74) *Attorney, Agent, or Firm*—Fish & Richardson P.C.

(57) ABSTRACT

An apparatus for controlling the irradiation direction of a lamp for a vehicle is provided with an actuator 3R for controlling the irradiation direction of a headlamp 2R and a controller (ECU) 1 for controlling the actuator 3R in accordance with a pitch angle of a vehicle. The controller 1 includes a monitor unit for monitoring the state of a control signal line CL for sending a control signal for controlling the actuator 3R and determines an abnormality of the controller, the actuator or the control signal line based on the state of the control signal line. The controller is not required to be connected to the actuator via a wire harness dedicated for the monitoring which is provided independently, so that the number of the wire harnesses can be prevented from increasing. Further, since the actuator is not required to be provided with a dedicated monitor circuit, the configuration of the actuator is prevented from being complicated.

8 Claims, 6 Drawing Sheets

IRRADIATION DIRECTION CONTROL APPARATUS AND METHOD

The present application claims foreign priority based on Japanese Patent Application No. P.2004-241909, filed on Aug. 23, 2004, the contents of which are incorporated herein by reference.

BACKGROUND OF THE INVENTION

1. Field of the Invention

The present invention relates to an apparatus and a method for controlling an irradiation direction of a vehicle lamp such as a headlamp and, in particular, relates to an apparatus and method for controlling the irradiation direction of a headlamp in a vertical direction in accordance with an angle of the front portion of a vehicle in a vertical direction with respect to a surface of a road.

2. Related Art

An amount of deflection of the spring of a suspension system which supports a vehicle body changes in accordance with changes of the loading state of goods or difference of passengers etc. within the vehicle. When the amount of deflection of the spring changes, a vertical depression angle of a front portion of the vehicle body with respect to a road surface, that is, an angle in a vertical direction (hereinafter called a pitch angle in this specification) the vehicle body along a longitudinal direction thereof with respect to the road surface may change. Thus, an irradiation direction (optical axis) of the headlamp attached to the front portion of the vehicle also changes in the vertical direction so as to follow the pitch angle. As a result, drivers of other vehicles such as oncoming vehicles are dazzled when the irradiation direction is directed upward, whilst an amount of light irradiation in the forward direction of the vehicle becomes insufficient when the irradiation direction is directed downward, both of which are not preferable in a view point of traffic safety. In order to keep the irradiation direction of the headlamp irrespective of such a change of the pitch angle of a vehicle, there is an auto-leveling apparatus. The auto-leveling apparatus includes a pitch angle detection means for detecting the pitch angle of the vehicle, a control means for outputting a control signal for adjusting the irradiation angle of the headlamp in the vertical direction in accordance with the pitch angle thus detected, and an actuator for adjusting the angle of the headlamp in the vertical direction with respect to the vehicle body based on the control signal from the control means.

According to such an auto-leveling apparatus, in most cases, the actuator and the headlamp are integrally constituted and the pitch angle detection means is constituted as a part of the controller of a vehicle together with the control means. Thus, the controller including the pitch angle detection means and the control means is coupled to the actuator by means of wire harnesses. When a failure occurs in the actuator, the controller recognizes the failure and is required to perform a so-called fail-safe operation such as the reduction of the light intensity of the headlamp or the fixing of the irradiation direction of the headlamp to a predetermined position. To this end, the controller is required to grasp the failure of the actuator. Disclosed in JP-A-2002-036945 is a technique in which a power supply voltage supplied to the actuator is monitored, and the actuator is stopped at the current position when the power supply voltage changes by a reference value or more. Disclosed in JP-A-2004-155249 is a technique in which a detection circuit is provided for detecting a current flowing through the coil of a motor constituting the actuator, and the failure diagnosis of the motor is performed based on the detection data of the detection circuit at the time of flowing a failure diagnosis current and at the time of not flowing the failure diagnosis current.

However, in the conventional techniques, in order for the controller to determine the abnormality of the actuator, it is required to connect the actuator with the controller by means of wire harnesses independently provided for determining the abnormality. As a result, there arise such problems that the number of cables increases, the number of the terminals of the controller increases in particular, which results in the difficulty in miniaturizing and light-weighting the apparatus and further reducing the cost of the apparatus. In JP-A-2002-036945, a monitor circuit independently provided for monitoring the abnormality of the power supply voltage and the wire harness for monitoring are required. In JP-A-2004-155249, the wire harness for flowing the current for the failure diagnosis and the detection circuit is required. Since each of JP-A-2002-036945 and JP-A-2004-155249 detects the abnormality of the actuator itself, when the wire harness for transmitting the control signal among the wire harnesses for connecting the controller and the actuators is broken or short-circuited, a normal control signal can not be sent to the actuator any more. In this case, since there arises no abnormality in the actuator itself, the abnormality of the control signal line can not be detected quickly.

SUMMARY OF THE INVENTION

In accordance with one or more embodiments of the present invention, an apparatus for controlling the irradiation direction of a lamp for a vehicle does not require a wire harness independently provided for monitoring the abnormality of a controller and an actuator and also does not require a device for detecting the abnormality of the actuator, thereby to realize the miniaturization, light-weighting and reduction of the cost of the apparatus.

In accordance with one or more embodiments of the present invention, an apparatus for controlling an irradiation direction of a lamp for a vehicle is provided with an actuator that controls an irradiation direction of a lamp; a controller that detects a pitch angle of the vehicle and controls the actuator in accordance with the pitch angle; a control signal line that sends a control signal for controlling the actuator from the controller to the actuator; and a monitor unit provided in the controller. The monitor unit monitors a state of the control signal line and determines an abnormality of the controller, the actuator or the control signal line based on the state of the control signal line.

In accordance with one or more embodiments of the present invention, the monitor unit may monitor a voltage of the control signal line and determines that the controller, the actuator or the control signal line is abnormal when the voltage is not a predetermined voltage.

In accordance with one or more embodiments of the present invention, the actuator may include an abnormality detection unit that detects an abnormality of the actuator; and a voltage fixing unit that fixes a voltage of the control signal line to a voltage different from the predetermined voltage when an abnormality of the actuator is detected.

In accordance with one or more embodiments of the present invention, the monitor unit may include a comparator that compares the voltage of the control signal line with a reference voltage set in advance; and a determination circuit that determines an abnormality based on an output of the comparator.

In accordance with one or more embodiments of the present invention, the monitor unit may include a comparator compares the voltage of the control signal line with a voltage just before applied to the control signal line; and a determination circuit that determines an abnormality based on an output of the comparator.

In accordance with one or more embodiments of the present invention, a method for controlling an irradiation direction of a lamp for a vehicle comprising: detecting a pitch angle of the vehicle; sending a control signal in accordance with the pitch angle from a controller via a control signal line to an actuator; monitoring a state of the control signal line; and determining an abnormality of the controller, the actuator or the control signal line based on the state of the control signal line.

In accordance with one or more embodiments of the present invention, since the monitor circuit of the controller always monitors the voltage etc. of the control signal line among the wire harnesses coupling between the controller and the actuator, the monitor circuit can detect an abnormality of the controller itself when an abnormality occurs in the controller. Further, since the actuator includes a means for short-circuiting the control signal line when an abnormality occurs at the actuator, the monitor circuit of the controller can detect an abnormality of the actuator. Furthermore, the monitor circuit can also detect an abnormality such as a broken or short-circuit of the control signal line. Thus, the controller is not required to be connected to the actuator via a wire harness dedicated for the monitoring which is provided independently, so that the number of the wire harnesses for realizing the monitor can be prevented from increasing. Further, since the actuator is not requited to be provided with a dedicated monitor circuit, the configuration of the actuator is prevented from being complicated.

Other aspects and advantages of the invention will be apparent from the following description and the appended claims.

DESCRIPTION OF THE PREFERRED EMBODIMENTS

Embodiments of the invention will be described with reference to the accompanying drawings.

Figure 1:
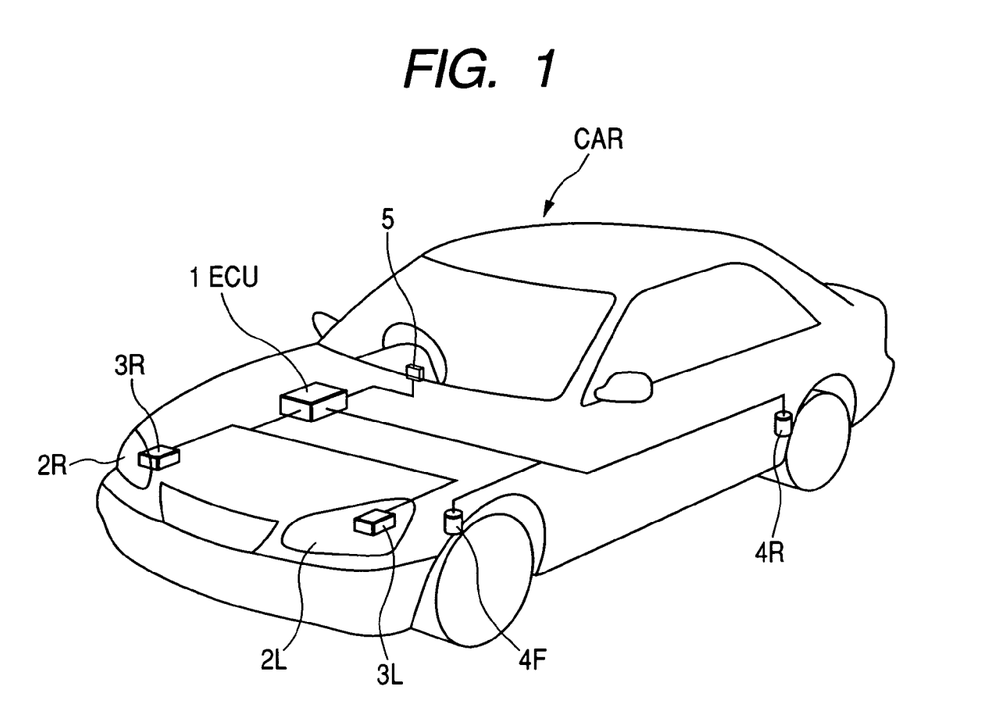
FIG. 1 is a conceptual constitutional diagram of a vehicle provided with an irradiation direction control apparatus.

FIG. 1 is a conceptual constitutional diagram of a vehicle provided with the irradiation direction control apparatus.

FIG. 1 shows an example in which the irradiation direction control apparatus is configured as a control apparatus for controlling the irradiation direction of a pair of headlamps 2L, 2R provided at the left and right portions of the front portion of a vehicle CAR. Left and right actuators 3L, 3R can respectively control the angles of the irradiation optical axes of the headlamps 2L, 2R in the vertical direction, that is, an up-down direction with respect to the vehicle body of the vehicle. An electronic control unit (ECU) 1 is further provided which contains a CPU therein as a controller of the actuators 3L, 3R for controlling the angles of the headlamps 2L, 2R, respectively. The ECU controls the irradiation direction of the headlamps so as to always form a constant angle in the vertical direction with respect to the road surface based on the change of the inclination in the vertical direction, that is, a pitch angle at the front portion of the vehicle provided with the headlamps. Further, in order to detect the pitch angle of the vehicle, vehicle height sensors 4F, 4R each for detecting the height of the vehicle with respect to the road surface are provided at the portions of the front wheel and the rear wheel of the vehicle, respectively. Although the detailed explanation of the vehicle height sensor is omitted, a length measuring sensor for measuring a distance in the vertical direction between the axle of the vehicle and the vehicle body can be used as the vehicle height sensor, for example. The ECU 1 calculates, in the CPU contained therein, an angle in the vertical direction of the vehicle body of the vehicle along the longitudinal direction thereof with respect to the road surface based on the vehicle heights of the respective portions detected by the vehicle height sensors. It is possible to provide the vehicle height sensor only at one of the front wheel and the rear wheel thereby to calculate the pitch angle only from the vehicle height detected by the single vehicle height sensor. Further, an alarm 5 for displaying the abnormality of the irradiation direction control apparatus is disposed at the dashboard of the driver s seat of the vehicle CAR.

Figure 2:
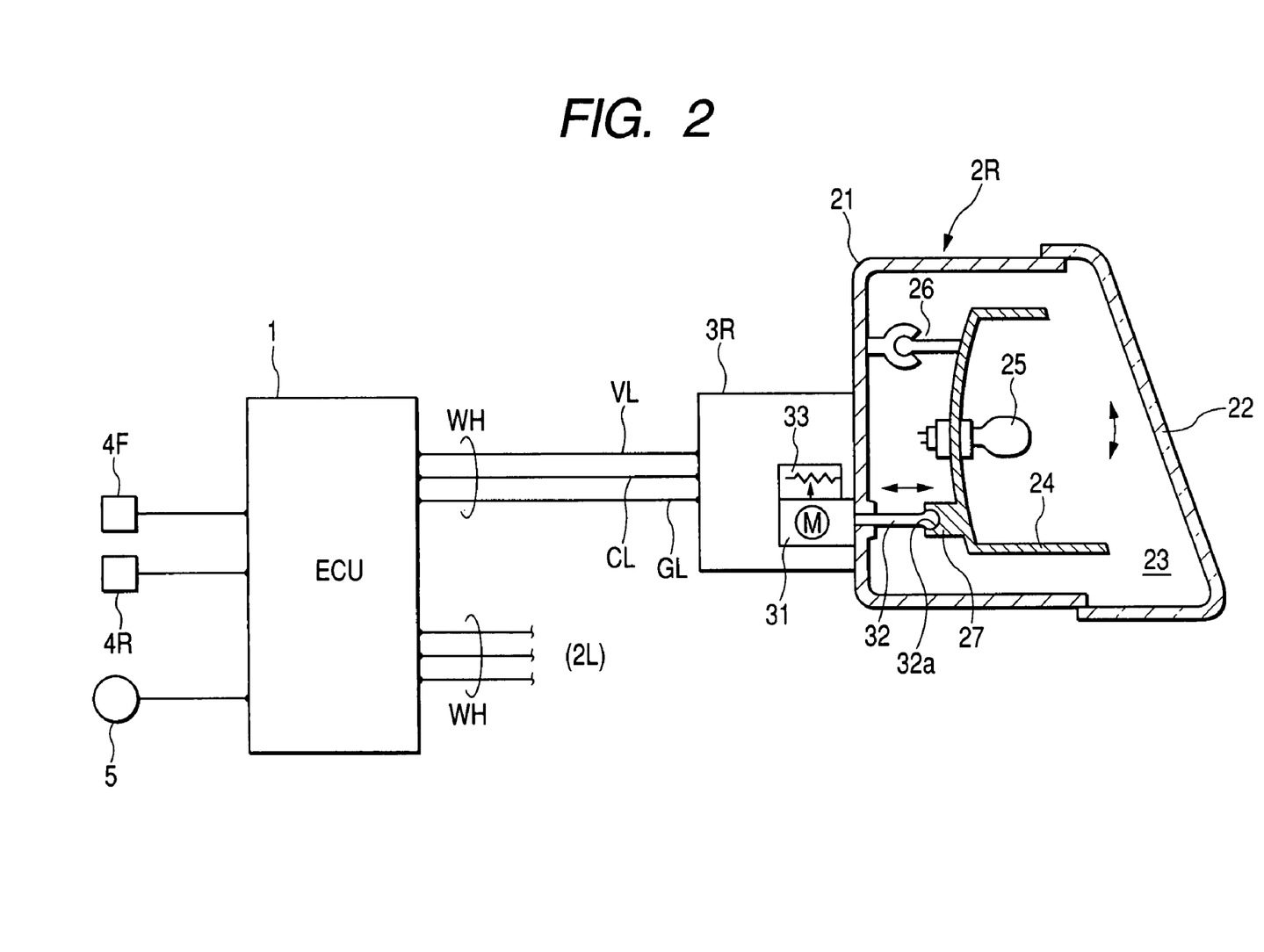
FIG. 2 is a diagram showing the configuration of one of headlamps and one of actuators.

The headlamps 2L, 2R at the left and right portions are configured in a bilaterally symmetrical manner. Thus, the right side headlamp 2R will be representatively explained with reference to FIG. 2. Within a lamp chamber 23 constituted by a lamp body 21 and a lens 22, a reflector 24 attached with a lamp 25 serving as a light source is supported so as to be able to inline in the vertical direction around a supporting axis 26 serving as a fulcrum. The actuator 3R is attached to the lamp body 21. The actuator 3R inclines the reflector 24 in the vertical direction. That is, the actuator 3R is provided with an adjusting rod 32 which is driven by a motor 31 to move reciprocally in the axial direction. A ball portion 32a provided at the tip end of the adjusting rod 32 fits into a ball support member 27 provided at the reflector 24, whereby the reflector 24 inclines in the vertical direction around the supporting axis 26 in accordance with the movement of the adjusting rod 32 in the axial direction. A potentiometer 33 is provided which output changes in accordance with the movement of the adjusting rod 32 in the axial direction. The actuator 3R is connected to the ECU 1 via three wire harnesses WH described later. The left side lamp 3L has the same configuration as the right side headlamp.

Figure 3:
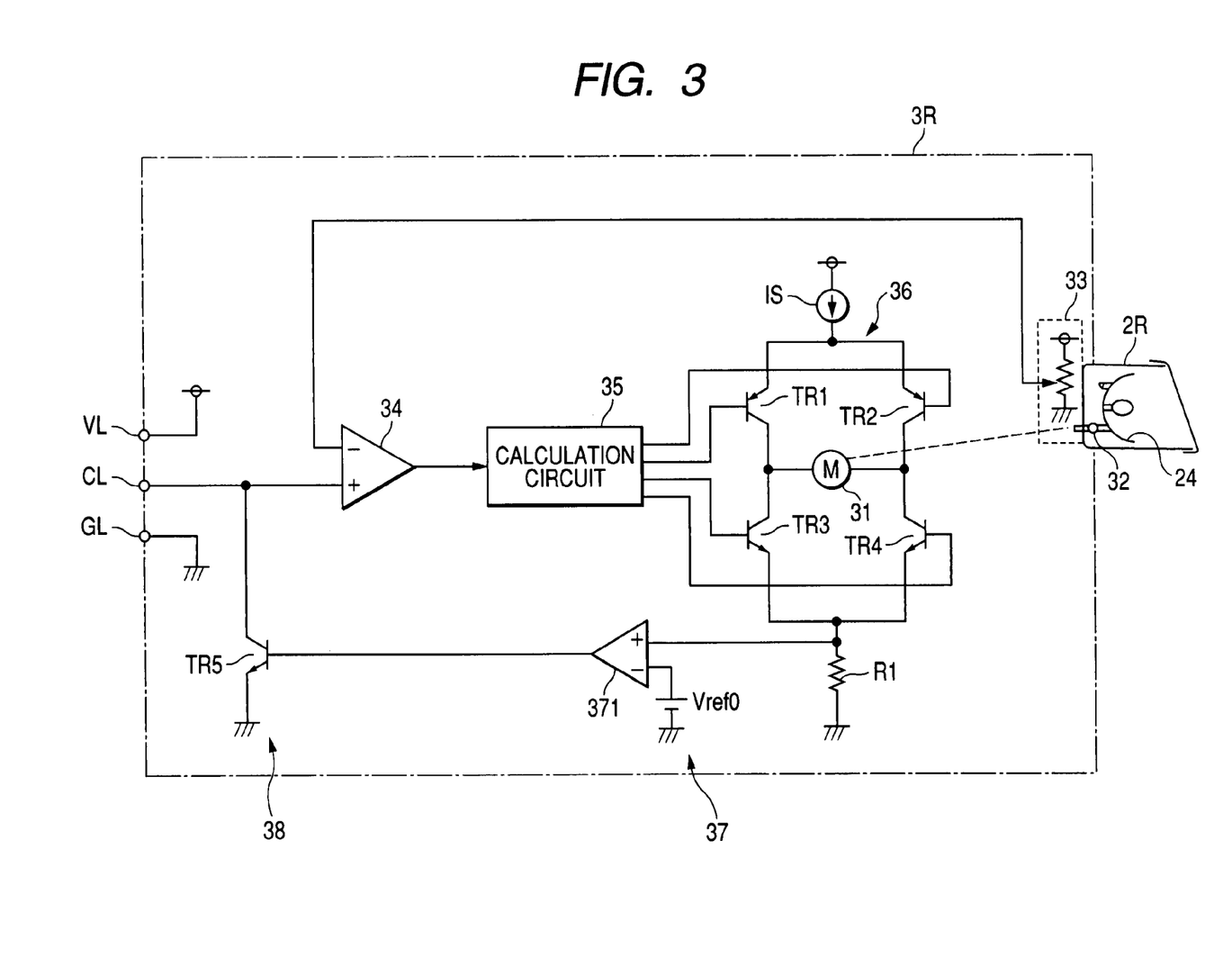
FIG. 3 is a diagram showing the internal configuration of the actuator.

FIG. 3 is a block diagram showing the internal configuration of the right side actuator 3R. The actuator 3R is electrically connected to the ECU 1 via the three wire harnesses WH. The three wire harnesses WH are configured by a power supply line VL, a control signal line CL and a ground (GND) line GL. In particular, the control signal line CL is supplied from the ECU 1 with a control signal for controlling the inclination angle of the reflector 24 of the headlamp 2R. The actuator 3R includes a comparator 34 which compares the output from the potentiometer 33 with the signal level of the control signal inputted from the control signal line CL to output a level difference therebetween, a calculation circuit 35 which performs a predetermined calculation based on the level difference outputted from the comparator 34, and an H bridge circuit 36 which applies a predetermined current to the motor 31 based on the output from the calculation circuit 35. The H bridge circuit 36 is configured in a manner that four transistors TR1 to TR4 are connected in a ladder shape (H-shape), the motor 31 is connected at the center portion, the one end of the H bridge circuit is coupled to a constant current source IS, the other end of the H bridge circuit is coupled to the ground, and the base of each of the transistors TR1 to TR4 is connected to the calculation circuit 35.

When the control signal is inputted into the actuator 3R, the potentiometer 33 detects, as a feedback signal, a voltage corresponding to the inclination angle of the reflector 24 of the headlamp 2R at this time. Then, the comparator 34 compares the level of the feedback signal with the level of the control signal thereby to output a level difference therebetween. The calculation circuit 35 calculates outputs thereof such that the level difference of the comparator becomes zero and applies the outputs to the transistors TR1 to TR4 of the H bridge circuit 36. The H bridge circuit 36 rotates the motor 31 based on a current corresponding to the output of the H bridge circuit 36, whereby the motor 31 is driven and rotated to a rotational position where the output of the comparator 34 becomes zero. Thus, the adjusting rod 32 is rotated around its shaft to drive and incline the reflector 24, so that the irradiation direction of the headlamp 2R can be controlled so as to form an angle following to the control signal.

The actuator 3R is further provided with a current detection circuit 37 which detects the current flowing through the H bridge circuit 36 in order to detect the abnormality of the motor 31. That is, when a failure such as a short-circuit, a burning, a locking state occurs in the motor 31, the current detection circuit detects the abnormal increase of the current generated in the H bridge circuit 36 and outputs a predetermined signal. The current detection circuit 37 is configured by a resistor R1 which converts the current flowing through the H bridge circuit 36 into a voltage and a comparator 371 which compares the voltage thus converted with a reference voltage Vref0. The comparator outputs a comparison signal as an abnormal signal when the current flowing through the H bridge circuit 36 increases above the reference value. Further, in order to fix the voltage of the control signal line CL to the ground level by the output of the current detection circuit 37, a short circuit 38 capable of short-circuiting the control signal line CL to the ground is provided. The short circuit 38 is configured by a transistor TR5 of an NPN type in this case. The transistor TR5 is turned on when the abnormal signal is inputted therein to ground the control signal line CL thereby to fix the voltage of the control signal line to the ground level, that is, 0 volt. The left side lamp 3L has the same configuration as the right side headlamp.

Figure 4:
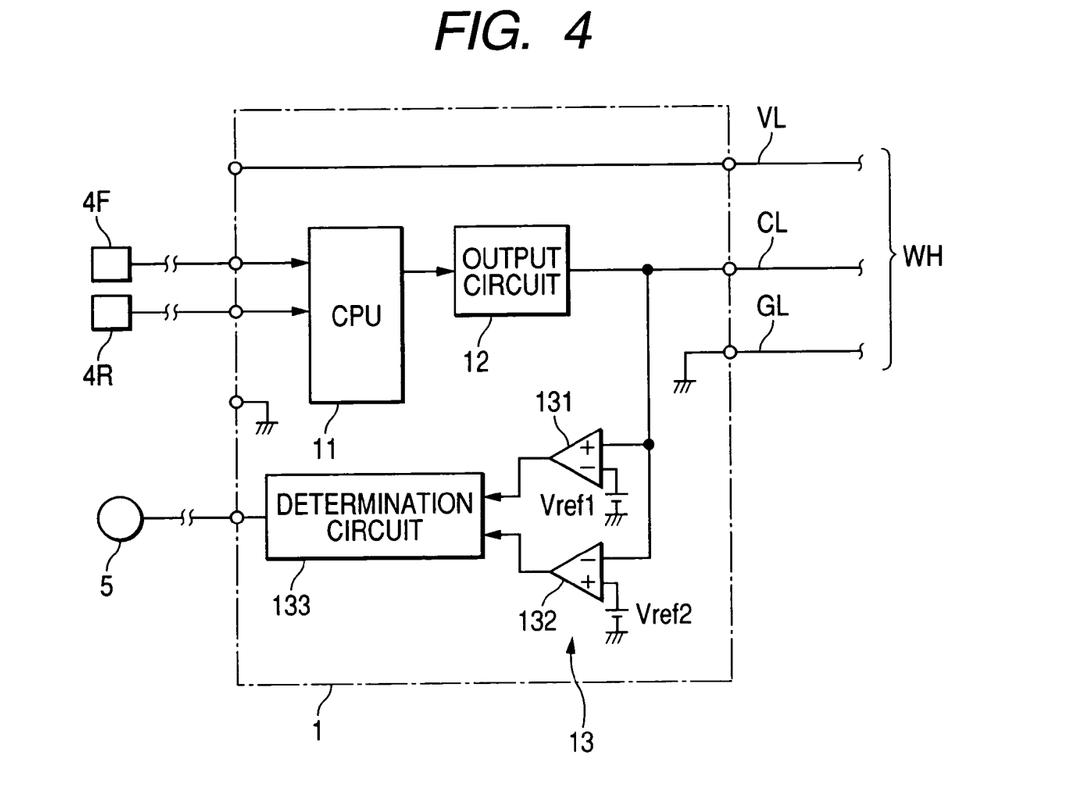
FIG. 4 is a diagram showing the internal configuration of an ECU.

On the other hand, as shown in FIG. 4, the ECU 1 serving as the controller is electrically connected to each of the actuators 3L, 3R via the wire harnesses WH configured by the power supply line VL, the control signal line CL and the GND line GL. The ECU 1 includes the CPU 11 for executing a predetermined processing as described above and further includes an output circuit 12 and a monitor circuit 13. The CPU 11 performs the calculation of a predetermined algorithm based on the vehicle height signal from the vehicle height sensors 4F, 4R to obtain the pitch angle of the vehicle. Further, the CPU calculates the inclination angle of the headlamps 2R, 2L in the vertical direction with respect to the vehicle body based on the pitch angle thus calculated and then calculates a setting signal for setting the headlamps to the inclination angle. As the setting signal, the CPU sets the number of rotation of the shaft of the adjusting rod 32 of each of the actuators 3R, 3L which is necessary to set the irradiation direction of the headlamp to the calculated inclined angle, and outputs, as a duty value of the PWM (pulse width modulation), a voltage ratio between the power supply voltage and a voltage necessary for driving and rotating the motor 31 by the number of rotation of the shaft. The output circuit 12 performs the digital-to-analog conversion of the setting signal (duty value) and supplies a voltage thus obtained through the conversion to the control signal line CL as the control signal, whereby the control signal is supplied to each of the actuators 3R, 3L.

The monitor circuit 13 is configured by a first comparator 131 and a second comparator 132 which compare in real time the voltage of the control signal line CL with a first reference voltage Vref1 and a second reference voltage Vref2 in order to monitor the state of the control signal line CL, that is, the voltage of the control signal line CL for outputting the control signal from the circuit 2; and a determination circuit 133 which inputs both the outputs of the comparators 131, 132. The determination circuit 133 determines the abnormality with a predetermined algorithm. As an example of the most simple configuration, the determination circuit is configured to output an abnormal signal when the voltage of the control signal line CL becomes higher than the first reference voltage Vref1 or lower than the second reference voltage Vref2. The abnormal signal from the determination circuit 133 is applied to the alarm 5 to alarm an abnormal state. Incidentally, the determination circuit 133 may be configured by the CPU 11. That is, the CPU 11 may be arranged to receive the outputs of the comparators 131, 132, determine the occurrence of abnormality based on these outputs and output the abnormal signal to the alarm 5.

Figure 5A:
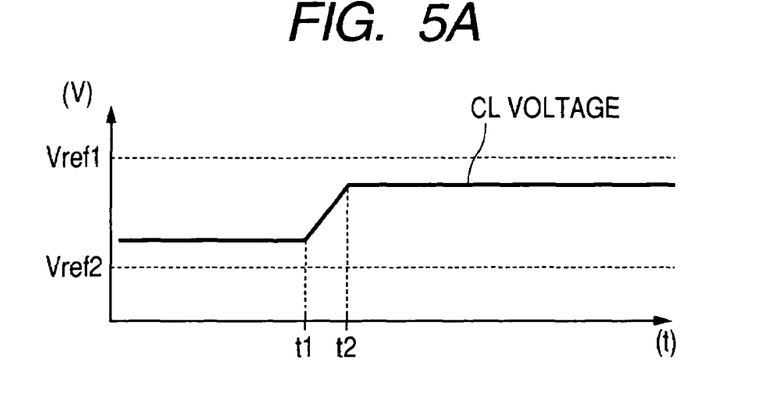
FIG. 5A is a diagram showing the voltage of the control signal on the control signal line, wherein the setting signal is inputted and the voltage of the control signal is increased.

The operation of the irradiation direction control apparatus configured in this manner will be explained. When the pitch angle of a vehicle changes due to the changes of the loading state of goods or difference of passengers etc. within the vehicle, this change is detected as the changes of the vehicle height signals detected by the vehicle height sensors 4F, 4R and the vehicle height signals are inputted into the ECU 1. In the ECU 1, the CPU 11 calculates the pitch angle from the changes of the vehicle heights, then recognizes the change of the irradiation direction of the headlamps 2R. 2L with respect to the road surface from the pitch angle thus calculated, then calculates a suitable inclination angle of the headlamps 2R. 2L with respect to the vehicle body so that the irradiation angle is set to form the predetermined angle, then generates the setting signal for setting the inclination angle thus calculated and supplies the setting signal to the output circuit 12. The output circuit 12 subjects the setting signal from the CPU 11 to the analog-to-digital conversion to obtain the control signal and supplies the control signal thus obtained to the actuators 3R, 3L via the control signal lines CL, respectively. FIG. 5A is a diagram showing the voltage of the control signal on the control signal line CL, wherein the setting signal is inputted to the output circuit 12 at a time point t1, then the voltage of the control signal is increased in accordance with the setting signal, and the setting state is completed at a time point t2.

In each of the actuators 3R, 3L, the comparator 34 compares the voltage detected by the potentiometer 33 with the voltage of the control signal inputted from the control signal line CL to output the voltage difference therebetween to the calculation circuit 35. The calculation circuit 35 calculates such an output that the voltage difference becomes zero and supplies the output to the H bridge circuit 36. The H bridge circuit 36 rotates the motor 31 based on the output from the calculation circuit. Thus, the motors 31 is rotated to a rotational position where the output of the comparator 34 becomes zero, whereby the adjusting rod 32 is moved in the axial direction to incline the reflector 24 of the headlamp 2R or 2L thereby to set the irradiation direction of the headlamp 2R or 2L to form an angle following the control signal, that is, to form the constant angle with respect to the road surface. Accordingly, a so-called auto-leveling control is performed, whereby the irradiation direction of the headlamps can be held to a suitable direction irrespective of the change of the pitch angle of a vehicle. Thus, sufficient light intensity can be realized without dazzling drivers of other vehicles, so that it is effective to secure the traffic safety.

Figure 5B:
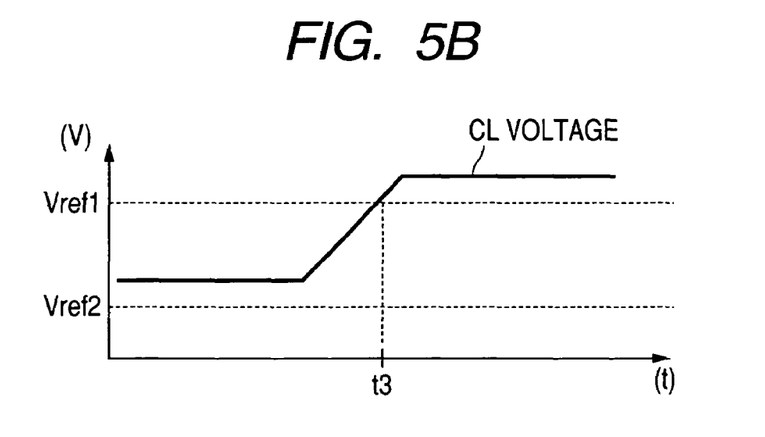
FIG. 5B is a diagram showing a state where an abnormality occurs at the CPU or the output circuit.

Consideration will be made as to a case where an abnormality occurs at the CPU 11 or the output circuit 12 constituting the ECU 1. In the case of occurring an abnormality at the CPU, the CPU 11 can not calculate the pitch angle normally based on the vehicle height signal from the vehicle height sensors 4F, 4R and further can not generate the setting signal normally. In the case of occurring an abnormality at the output circuit, the output circuit 12 can not output the control signal having a normal voltage corresponding to the setting signal even if the normal setting signal is inputted from the CPU 11. In any case, the ECU 1 can not output a normal control signal to the control signal line CL. When the abnormal control signal is within the predetermined voltage range, even if the actuators 3R, 3L operate to incline the headlamps 2R, 2L based on the abnormal control signals, there does not arise such phenomena interfering the traffic safety that drivers of other vehicles are dazzled or the irradiation range is extremely limited. In contrast, when the abnormal control signal exceeds the predetermined voltage range, the irradiation range changes to such a range of dazzling drivers of other vehicles or interfering the traffic safety. FIG. 5B shows a state where an abnormality occurs at the CPU 11 or the output circuit 12 and so the voltage of the control signal increases. In this case, the voltage of the control signal exceeds the first reference voltage Vref1 at a time point t3 and further increased abnormally.

When such an abnormal control signal is outputted to the control signal line CL, since the first comparator 131 and the second comparator 132 of the monitor circuit 13 compare the voltage of the control signal line CL with the reference voltages Vref1 and Vref2, respectively, the output of the first comparator 131 is inverted when the voltage of the control signal line exceeds the first reference voltage Vref1 at the time point t3, and so the determination circuit 133 outputs the abnormal signal in response thereto. Although not shown in FIG. 5B, the same phenomenon arises when the voltage of the control signal line becomes lower that the second reference voltage Vref2. The alarm 5 executes an alarm operation such as lighting or blinking based on the abnormal signal from the determination circuit 133. Thus, a driver can recognize that an abnormality occurs at the auto-leveling apparatus and so take a suitable measure. For example, the driver takes a measure such as cancellation of the auto-leveling apparatus, forcedly fixing of the headlamps to the predetermined irradiation direction, reduction of the light intensity of the headlamps, thereby to maintain the minimum requirement state necessary for the safety traffic.

Figure 5C:
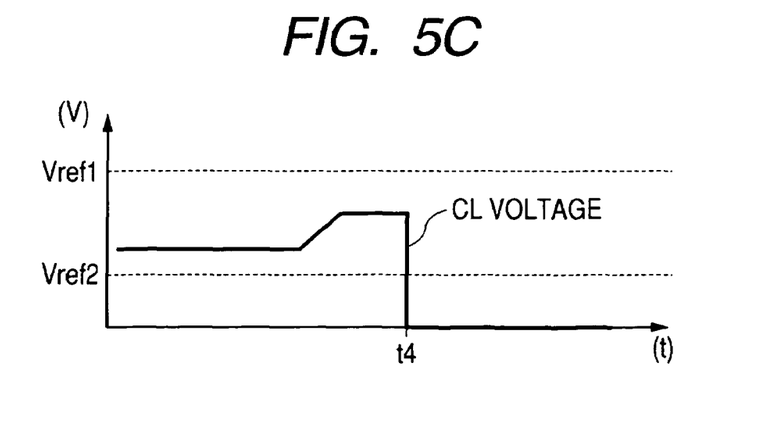
FIG. 5C is a diagram showing a state where the short circuit is short-circuited due to the generation of the abnormality at the actuator.

On the other hand, when an abnormality occurs at the actuator 3R or 3L, in general, when the motor 31 dos not rotate due to a short-circuit, a burning, a locking state etc., or when the reflector 24 does not incline due to the abnormality of the mechanical portion of the headlamp 2R or 2L and so the motor 31 does not rotate, the current flowing through the H bridge circuit 36 takes an abnormal value. Since the current flowing through the H bridge circuit 36 is monitored by the current detection circuit 37, when the current flowing through the H bridge circuit 36 increases, the voltage applied to the comparator 371 increases and exceeds the reference voltage Vref0 and so the comparator 371 outputs the abnormal signal. The transistor TR5 of the short circuit 38 is turned on in response to the abnormal signal thereby to fix the control signal line CL to the ground level, that is, 0 volt. In FIG. 5C, the short circuit 38 is short-circuited at a time point t4 due to the generation of the abnormality at the actuator 3R or 3L, and so the voltage of the control signal line CL is set to 0 volt.

When the voltage of the control signal line CL is fixed to 0 volt, the voltage of the control signal line CL is kept at 0 volt even when the control signal of the predetermined voltage is applied to the control signal line CL from the ECU 1. Thus, the monitor circuit 13 of the ECU 1 detects at the determination circuit 133 that the voltage of the control signal line is lower than the second reference voltage Vref2 and so outputs the abnormal signal to the alarm 5, whereby the alarm 5 executes the alarm operation such as lighting or blinking based on the abnormal signal. Accordingly, a driver can recognize that there arises an abnormality and can take a suitable measure.

In this manner, since the monitor circuit 13 of the ECU 1 always monitors the voltage of the control signal line CL of the three wire harnesses WH connected between each of the actuators 3R, 3L and the ECU 1, the monitor circuit 13 can detect the abnormality of the ECU 1 itself when an abnormality occurs at the CPU 11 or the output circuit 12 of the ECU 1. Further, even when an abnormality occurs at the actuator 3R or 3L, the abnormality of the actuator 3R or 3L can be detected by the monitor circuit 13 of the ECU 1. Furthermore, even when such an abnormality occurs that the control signal line CL is disconnected or short-circuited, the abnormality can be detected since the voltage of the control signal line CL exceeds the first reference voltage Vref1 or reduces below the second reference voltage Vref2. Accordingly, even if the ECU 1 and each of the actuators 3R, 3L are not connected via a wire harness dedicated for the monitoring provided separately from the power supply line, the control signal line and the ground line, an abnormality of the ECU and the actuators can be surely detected and the increase of the number of the wire harnesses for realizing the monitoring can be prevented.

Figure 6:
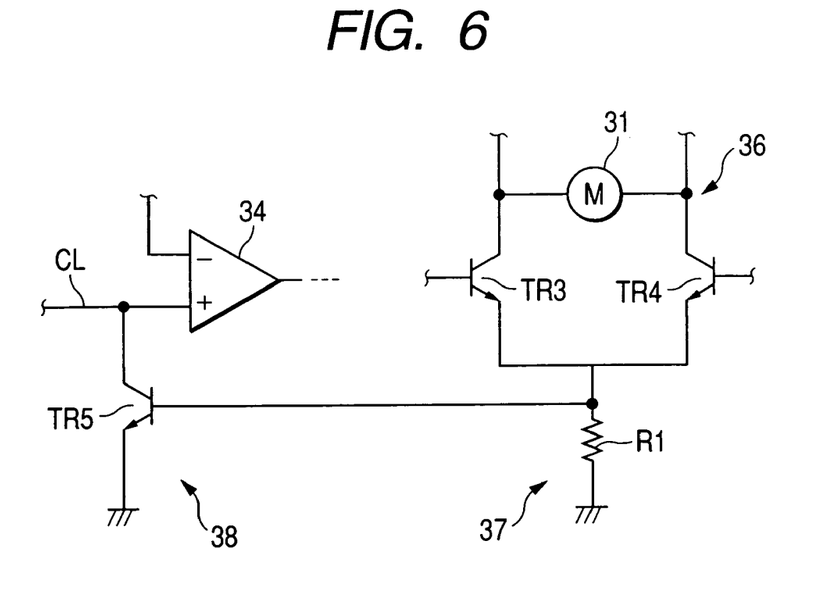
FIG. 6 is a circuit diagram showing a modified example of the current detection circuit and the short circuit of the actuator.

Further, each of the actuators 3R, 3L is required to include only the current detection circuit 37 and the short circuit 38 in order to fix the control signal line CL to the ground level and not required to include a monitor circuit having the determination circuit 133 for executing the algorithm for determining the abnormality provided in the ECU 1, so that the configuration of each of the actuators 3R, 3L is prevented from be coming large. In particular, in the aforesaid embodiment, the current detection circuit 37 of each of the actuators 3R, 3L is configured to include the comparator 371. Alternatively, the current detection circuit may be configured in a manner as shown in FIG. 6 that the voltage across the resistor R1 coupled to the current path of the H bridge circuit 36 is directly applied to the base of the transistor TR5 of the short circuit 38 such that, in particular, the transistor TR5 is turned on when the voltage across the resistor R1 exceeds the predetermined voltage thereby to short-circuit the control signal line CL. In such a circuit configuration, the comparator 371 and the reference voltage Vref0 shown in FIG. 3 are not required and so it is more effective in a view point of further simplifying the configuration of the actuators 3R, 3L.

Further, in the aforesaid embodiment, the monitor circuit 13 of the ECU 1 is configured by the two comparators 131, 132 and the determination circuit 133 determines the abnormality based on the outputs of these comparators 131, 132. Alternatively, the monitor circuit may be configured in a manner that the voltage on the control signal line CL is subjected to the digital-to-analog conversion, and the digital value thus converted is compared with a reference digital value at the determination circuit 133 thereby to determine an abnormality on the control signal line CL. In this case, it is effective to simplify the configuration of the monitor circuit 13.

Figure 7:
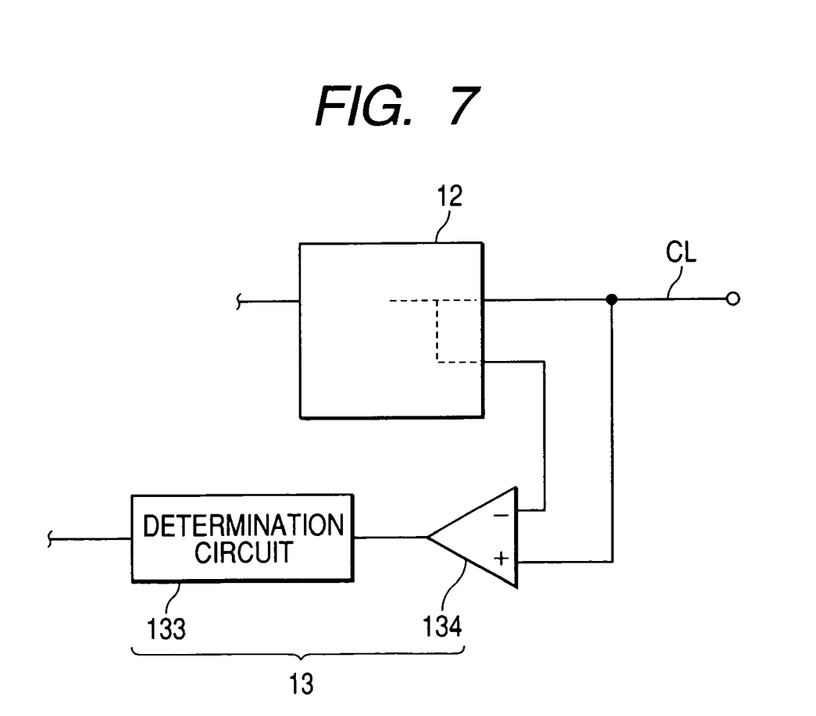
FIG. 7 is a circuit diagram showing a modified example of the monitor circuit of the ECU.

Furthermore, in the aforesaid embodiment, the voltage on the control signal line CL is compared with the reference voltage. In this case, when the degree of the voltage change on the control signal line CL is not remarkable, the voltage of the control signal on the control signal line CL may change within the range of the first and second voltages. In this case, it is difficult to detect an abnormality in the aforesaid embodiment. Thus, the circuit configuration shown in FIG. 7 is arranged in a manner that the voltage on the control signal line CL detected by the monitor circuit 13 is directly compared by a comparator 134 with the voltage of the control signal just before outputted from the output circuit 12. In this case, the voltage outputted on the control signal line CL and the control signal just before outputted from the output circuit to be compared to each other are placed in an isolated state to each other so as not to interfere to each other.

When an abnormality occurred at the control signal line CL is not so remarkable, the voltage of the control signal sent through the control signal line CL merely changes slightly. However, according to this configuration, since the actual voltage on the control signal line CL is compared with the voltage of the control signal just before outputted from the output circuit 12, the change of the voltage on the control signal line CL can be detected with a high sensitivity, so that even a slight abnormality on the control signal line can be detected.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An apparatus for controlling an irradiation direction of a lamp for a vehicle, the apparatus comprising:
   an actuator that controls an irradiation direction of a lamp;
   a controller that detects a pitch angle of the vehicle and controls the actuator in accordance with the pitch angle;
   a control signal line that sends a control signal for controlling the actuator from the controller to the actuator; and
   a monitor unit that is provided in the controller, monitors a state of the control signal line and determines an abnormality of the controller, the actuator or the control signal line based on the state of the control signal line;
   wherein the monitor unit monitors a voltage of the control signal line and determines that the controller, the actuator or the control signal line is abnormal when the voltage is not a predetermined voltage; and
   wherein the actuator includes:
     an abnormality detection unit that detects an abnormality of the actuator; and
     a voltage fixing unit that fixes a voltage of the control signal line to a voltage different from the predetermined voltage when an abnormality of the actuator is detected.

2. The apparatus according to claim 1,
   wherein the monitor unit includes:
     a comparator that compares the voltage of the control signal line with a reference voltage set in advance; and
     a determination circuit that determines an abnormality based on an output of the comparator.

3. The apparatus according to claim 1,
   wherein the monitor unit includes:
     a comparator that compares the voltage of the control signal line with a voltage just before applied to the control signal line; and
     a determination circuit that determines an abnormality based on an output of the comparator.

4. The apparatus according to claim 1,
   wherein the actuator further includes:
     a short circuit capable of short-circuiting the control signal line to a ground.

5. A method for controlling an irradiation direction of a lamp for a vehicle; the method comprising:
   detecting a pitch angle of the vehicle;
   sending a control signal in accordance with the pitch angle from a controller via a control signal line to an actuator;
   monitoring a state of the control signal line;
   determining an abnormality of the controller, the actuator or the control signal line based on the state of the control signal line;
   monitoring a voltage of the control signal line;
   determining that the controller, the actuator or the control signal line is abnormal when the voltage is not a predetermined voltage;
   detecting an abnormality of the actuator; and
   fixing a voltage of the control signal line to a voltage different from the predetermined voltage when an abnormality of the actuator is detected.

6. The method according to claim 5, further comprising:
   short-circuiting the control signal line to a ground when the abnormality of the actuator is detected.

7. The method according to claim 5, further comprising:
   comparing a voltage of the control signal line with a reference voltage set in advance.

8. The method according to claim 5, further comprising:
   comparing a voltage of the control signal line with a voltage just before applied to the control signal line.

* * * * *